Dec. 24, 1963

W. C. ERWIN 3,115,146

CONTACT LENS HOLDER

Filed Dec. 1, 1960

INVENTOR.
WELDON C. ERWIN
BY *Elliott & Pastoriza*
ATTORNEYS

Dec. 24, 1963  W. C. ERWIN  3,115,146
CONTACT LENS HOLDER
Filed Dec. 1, 1960  3 Sheets-Sheet 2

INVENTOR.
WELDON C. ERWIN
BY *Elliott & Pastoriza*
ATTORNEYS

Dec. 24, 1963 W. C. ERWIN 3,115,146
CONTACT LENS HOLDER
Filed Dec. 1, 1960 3 Sheets-Sheet 3

INVENTOR.
WELDON C. ERWIN
BY *Elliott & Pastoriza*
ATTORNEYS

United States Patent Office 3,115,146
Patented Dec. 24, 1963

3,115,146
CONTACT LENS HOLDER
Weldon C. Erwin, 8939 State St., Southgate, Calif.
Filed Dec. 1, 1960, Ser. No. 73,068
6 Claims. (Cl. 134—137)

This invention relates to devices for holding contact lens and more particularly to a novel container structure for facilitating both washing and storing of contact lens.

As is well known to those skilled in the art, contact lens type glasses comprise miniature correcting lens for the eyes which may be respectively positioned directly over the cornea of each eye. Conventionally, these lens are removed from the eyes at night and replaced in the morning. Further, it is common practice to wash the lens after removal and before storing the same overnight and in the morning to rinse the lens before inserting them in the eyes. Both operations require considerable direct manual handling of the lens, and because of their relatively small size, they can be easily lost.

While special holders have been provided for retaining contact lens when not in use, there is still present the necessity to remove the lens from the holders for rinsing or washing, and it is during such periods that a loss either to accidental dropping or misplacement is most likely to occur.

With the foregoing in mind, it is a primary object of this invention to provide a novel contact lens holder which serves the dual function of not only providing a storing place for the lens but also facilitating washing and rinsing of the lens to the end that a minimum amount of physical handling of the lens by the user's hands is required.

More particularly, it is an object to provide a contact lens holder in which the only time it is necessary to remove or replace the lens is when the lens are to be inserted in the user's eyes or removed from the user's eyes and stored overnight.

Other objects of the invention are to provide an improved contact lens holder which is compact, extremely easy to use with a minimum possibility of losing the lens therefrom, and which may be operated even in dark areas with proper identification of the right and left lens being insured.

Briefly, these and many other objects and advantages of this invention are attained by providing first and second members coupled together for relative movement. One of the members includes cavities for receiving the contact lens and the other member constitutes a cover for closing the upper openings of the cavities when moved to a first position. Both members additionally include communication openings passing from the exterior into the cavities when the cover member is positioned over the cavities, such openings being of smaller dimensions than the dimensions of the lens themselves. By this arrangement, the lens is held within its cavity and yet both members may be immersed in a cleaning solution and swished back and forth to circulate water through the communication openings and thus wash and rinse the lens. Thus, the same container structure for separating the lens during storage also serves as a holder for the lens during washing thereof. Handling by the user's hands of the lens themselves is thus minimized and is only necessary at the time of actual insertion or removal of the lens from the eyes.

A better understanding of this invention will be had by referring to the accompanying drawings, in which.

Figure 1:
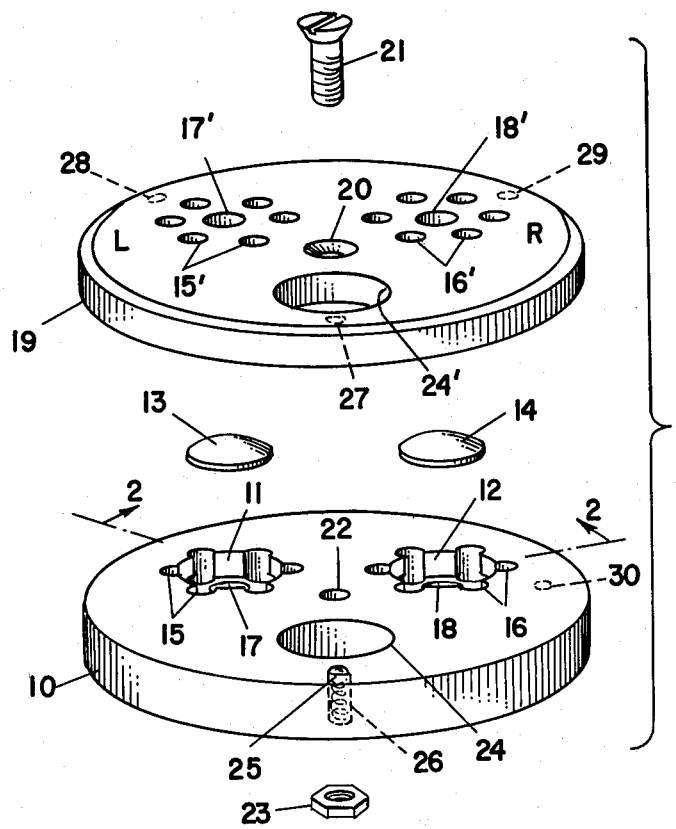
FIGURE 1 is an exploded perspective view of the preferred embodiment of the lens holder of this invention.

Referring first to FIGURE 1, the holder comprises a base member 10 in the form of a disc provided on one surface with cavities 11 and 12 in the form of circular bores extending normally into the top surface of the member 10. These cavities are arranged to receive and store contact lens such as indicated at 13 and 14 for the left and right eye, respectively.

Also provided in the base member 10 are communication means in the form of a plurality of holes 15 and 16 passing entirely through the base member 10 in a direction parallel with the axis of the bores 11 and 12 respectively and intersecting the peripheries of the bores. The bores 11 and 12 themselves do not extend entirely through the member 10 but terminate short of the bottom thereof, there being provided a smaller circular opening as indicated at 17 and 18 passing through the remaining bottom portion of the base member 10.

A cover member 19 in turn includes communication openings in the form of a plurality of holes 15' and 16' and openings 17' and 18' arranged to register with the holes 15 and 16 and the openings 17 and 18 in the base member 10 when the cover member 19 is positioned thereon.

As shown, the member further includes a central opening 20 receiving screw 21 arranged to be threaded into a threaded opening 22 in the center portion of the base member 10. A lock nut 23 shown in the bottom portion of the exploded view in FIGURE 1 in turn is secured on the lower end of the screw 21 to lock the screw into position. With this arrangement, the cover member 19 is pivoted to the base 10 and may be rotated relative to the base member to cause the various communication openings 15' and 16' to cover and be in registration wtih the openings 15 and 16 of the cavities 11 and 12 when in a first position.

The base member 10 includes an enlarged circular opening 24 radially spaced from the center of the disc by a distance equal to the radial spacing of the circular bores 11 and 12, respectively. The cover member 19 similarly includes an enlarged circular opening 24' which will register with the opening 24 when the cover member 19 is assembled on the base member 10 in its first referred to position.

Figure 2:
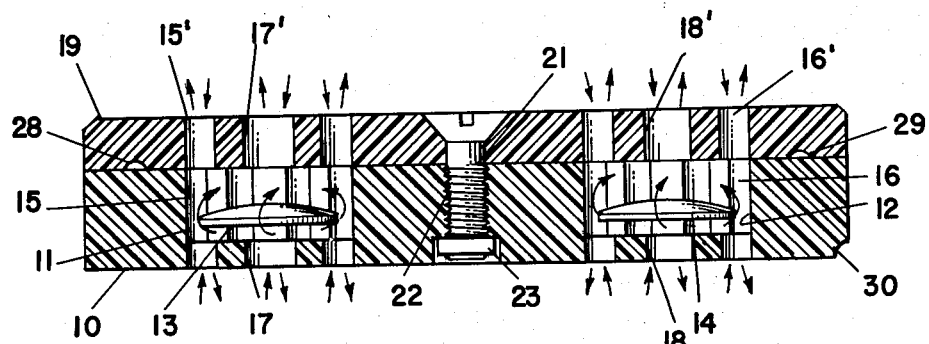
FIGURE 2 is a cross section of the assembled parts of FIGURE 1 taken generally in the direction of the arrows 2—2.

The foregoing structure will be more evident by reference to FIGURE 2 wherein the device is shown in assembled form in the referred to first position.

It will be evident that if the enlarged circular opening 24' in the cover member 19 is of a dimension greater than the dimensions of the contact lens 13 and 14, by rotating the cover member 19 to position the circular opening 24' over the cavity 11 of the base member 10, the lens may be removed or inserted. Similarly, the enlarged opening 24' may be further rotated to a position to expose the cavity 12 and thus permit the insertion of the contact lens 14. When the opening 24' is returned to its position in registration with the opening 24, the two openings together serve as a convenient handle or holding means for a user to hold the assembled structure.

With particular reference to FIGURE 2, it will be noted that when the lens 13 and 14 are positioned in the cavities, they will be retained therein when the cover member is in the first position. The dimensions of the communication holes 15, 15' and 16, 16' as well as the openings 17, 18, and 17' and 18' are less than the dimensions of the contact lens. Thus, the lens 13 and 14 will be held within the assembled structure.

In order to help an operator in properly positioning the enlarged circular opening 24' of the cover 19 over one or the other of the cavities 11 and 12 or even in its normal first position in registration with the opening 24 in the base member 10, there is provided a suitable ball and spring structure 25 and 26 in the base member arranged to cooperate with a detent 27 in the bottom of the cover member. Similar detents 28 and 29, as best shown in FIGURE 2, are provided adjacent the cavities 11 and 12 for proper indexing with the ball 25. The lens cavities may be identified by the letters L and R as shown on the cover for the left and right eye lens respectively. Further, in the event it is dark or the user cannot see well, the base 10 may be provided with a notch 30 as best shown in FIGURE 2 so that by feeling this notch the cavity for the right eye lens can be identified.

With particular reference to FIGURE 2, it will be noted that the screw 21 is threaded only to the lower base member 10 and nut 23. With this arrangement, tightening of the screw 21 will adjust the engagement pressure of the opposed faces of the base member 10 and cover member 19 so that a desired amount of friction may be provided. Once this friction has been established, the lock nut 23 may be threaded tightly to the screw 21 and thus prevent unthreading of the screw 21 as a consequence of motion of the cover 19.

The operation of the contact lens holder shown in FIGURES 1 and 2 will be evident from the foregoing description.

With the component parts of FIGURE 1 assembled as shown in FIGURE 2, when a user wishes to store his lens overnight, he will first rotate the cover member 19 to bring the enlarged circular opening 24' into registration with the first cavity 11 of the base member 10. The ball 25 in this position will register within the detent 28. The user may then remove the left contact lens from his eye and insert it through the enlarged circular opening 24' so that it will fall within the cavity 11. The user then rotates the cover member 19 until the enlarged circular opening 24' registers with the second cavity 12. The right contact lens may then be removed from his eye and placed in this cavity. It should be noted that during this latter operation the first cavity 11 has been eclipsed by portions of the cover member 19 so that the left contact lens is held in place, and there is no possibility of the same falling out while inserting the right contact lens.

After the right contact lens has been inserted, the cover member 19 is rotated further until it is in its initial position with the enlarged circular opening 24' in registration with the circular opening 24 of the base member 10. This position is also indexed by the spring biased ball 25 and detent 27.

The user may then conveniently hold the two members with his thumb and forefinger in the openings 24' and 24, respectively, and swish the same back and forth through a suitable cleaning solution.

With particular reference to FIGURE 2, there is indicated the flow of the cleaning solution by the various arrows and it will be evident that the solution may be readily passed back and forth through the cavity to thoroughly wash the respective lens. Because of the intersection of the communication holes with the periphery of the circular bores defining the cavities 11 and 12, the solution will pass about the peripheral edges of the lens and be curved in the flow path thereby to insure a thorough washing action over the entire surface of the lens. The central registered circular openings 17 and 17' for the cavity 11 and 18 and 18' for the cavity 12 also receive and pass fluid which must necessarily circulate about the respective lens. There is thus provided a thorough washing action.

The user may then store the holder overnight in any suitable container, a preferable form of which will be described subsequently.

In the morning, the user may again simply swish the entire holder through a suitable rinsing solution. To then remove the lens, the user will rotate the cover member 19 so that the enlarged circular opening 24' registers with the first cavity 11 and the left contact lens may be removed. This lens is then inserted in the eye. The cover member 19 is then further rotated to expose the cavity 12 and enable removal of the right contact lens for insertion in the eye.

Since only one cavity at a time is exposed for enabling removal of the lens maximum safety against possible dropping of the lens from the holder and losing of the same is insured. Moreover, because the holder also serves as a vehicle to support the lens during the washing action, no handling of the lens is necessary during washing providing further assurance against accidental loss of the lens.

Figure 3:
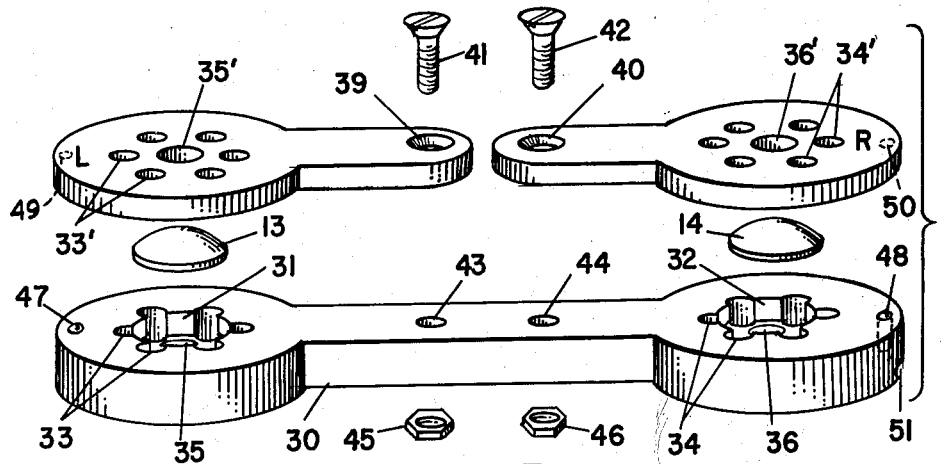
FIGURE 3 is an exploded perspective view of a second embodiment of the invention.
Figure 4:
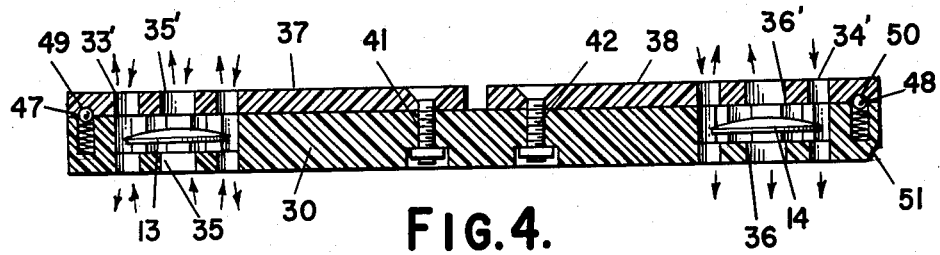
FIGURE 4 is a cross section of the assembled components of FIGURE 3.

Referring now to FIGURES 3 and 4, there is illustrated a second embodiment of the invention similar to the first embodiment except that a shape different from circular is employed. Thus, there is provided a lower base member 30 of a general dumbbell shape having suitable cavities 31 and 32 in the form of circular bores provided with a plurality of communication openings 33 and 34, all identical to the corresponding structure described in connection with FIGURE 1. The bores 31 and 32 terminate short of the bottom of the member 30 and communicate with a central smaller diameter opening such as indicated at 35 for the bore 31 and 36 for the bore 32.

Cooperating with the base member 30 are cover means including individual cover members 37 and 38. These members may be respectively pivoted as through suitable openings 39 and 40 by screws 41 and 42 received within threaded openings 43 and 44 in the base member 30. Lock nuts 45 and 46 will secure the screws into position in a manner identical to the corresponding structure described in FIGURE 1. However, because of the use of two separate screws, the cover members 37 and 38 may be individually pivoted or slid relative to the base member 30 to expose the cavities 31 or 32.

To provide proper indexing, suitable spring biased balls 47 and 48 receivable within detents 49 and 50 for the left and right hand lens cavities 31 and 32 may be provided.

The cover members 37 and 38 each include a plurality of communication openings in the form of holes 33' and 34' arranged to register with the holes 33 and 34 in the base member cavities 31 and 32. Similarly, central smaller diameter openings 35' and 36' register with the openings 35 and 36 in the bottom of the cavity.

In the operation of the embodiment of FIGURES 3 and 4, the lens 13 and 14 are respectively inserted within the cavities 31 and 32 by simply sliding the corresponding covers 37 and 38 to one side to expose the cavities and sliding the covers back into a first position to cover the cavities.

A suitable washing and rinsing action may then take place as indicated by the arrows in FIGURE 4 by swishing the entire holder through a proper solution.

As in the case of the embodiment of FIGURES 1 and 2, a portion of the base member adjacent the right hand cavity for receiving the right hand lens 14 may be provided with a notch 51 so that by feel a user may determine which side of the member 30 contains the right eye contact lens.

Figure 5:
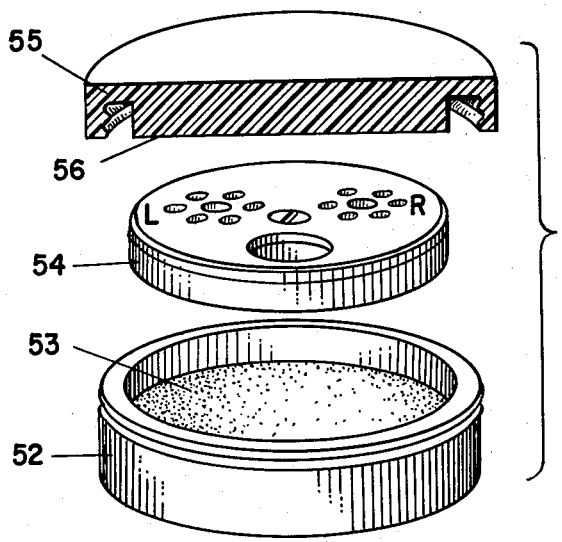
FIGURE 5 is an exploded perspective view partly cut away of a suitable container for use with the lens holder during storage.

Referring now to FIGURE 5, there is illustrated a container for facilitating storing of the holder of the embodiment of FIGURES 1 and 2 overnight or for any given period of time. As shown, this structure includes a circular jar 52 containing a sponge 53 impregnated with a suitable solution for preserving the lens. The holder, designated generally by the numeral 54, is simply placed on top of the sponge 53 and a cover 55 threaded onto the jar 52. The cover itself is provided with a circular central projection 56 which will engage the top surface of the holder 54 and force the holder down into the sponge 53. Solution will thus be caused to pass through the various communication openings in the holder to maintain the lens immersed in the solution.

A similar container may be provided for the holder shown in FIGURES 3 and 4 except that it would have to be considerably larger if a circular container structure were to be employed.

Figure 6:
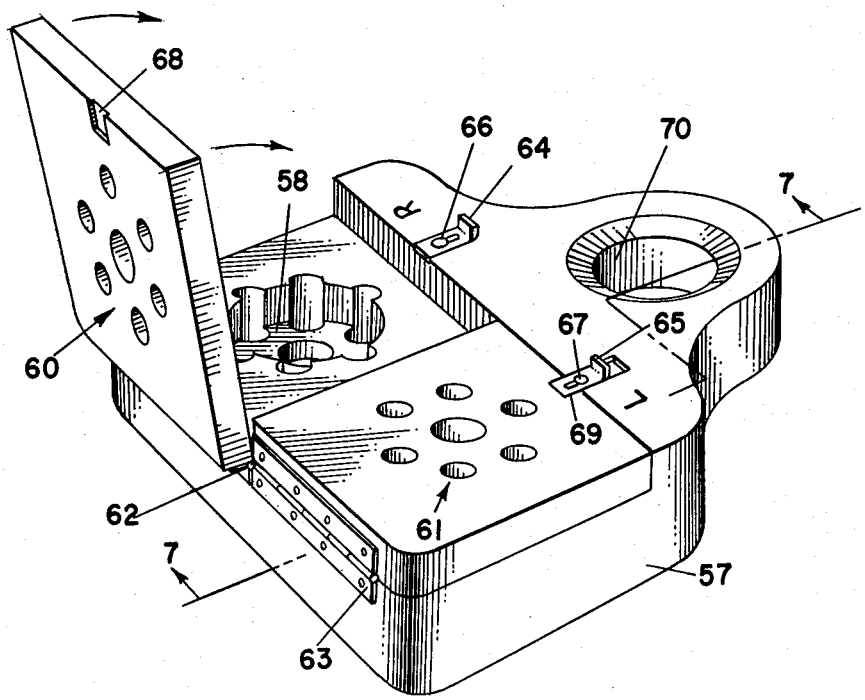
FIGURE 6 is a perspective view of a third embodiment of the invention.
Figure 7:
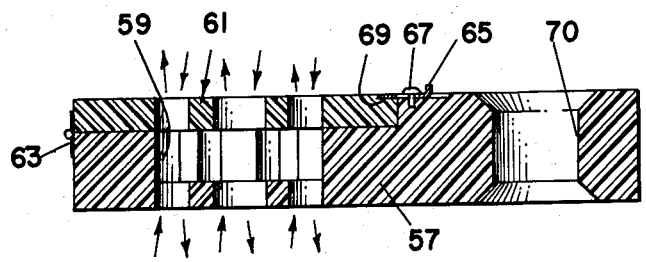
FIGURE 7 is a cross section taken in the direction of the arrows 7—7 of FIGURE 6.

FIGURES 6 and 7 show a third embodiment of the invention somewhat more compact in overall dimensions from the embodiment of FIGURES 3 and 4. As a consequence, the embodiment of FIGURES 6 and 7 could be readily fitted within a storing jar such as the type described in connection with FIGURE 5.

In the third embodiment shown in FIGURES 6 and 7, there is provided a base 57 having bore cavities 58 and 59 arranged to be covered by suitable cover members 60 and 61 for the right and left eyes, respectively. The cavities 58 and 59 and the covers 60 and 61, respectively, include peripheral bores or openings identical to the openings for the base and cover members described in the embodiment of FIGURES 1 and 2 and the embodiment of FIGURES 3 and 4.

Rather than sliding the cover members relative to the base, however, each of the covers are hinged as at 62 and 63 to the base 57 and arranged to be locked over their respective cavities as by suitable slides 64 and 65 guided by slide pins 66 and 67. The ends of these slides in turn are arranged to be received in small recesses 68 and 69 in the top front edges of the covers 60 and 61, respectively. The rear portion of the base 57 includes a circular bore 70 serving as a convenient holding handle.

As will be evident from FIGURE 7, washing action of the contact lens held within respective cavities 58 and 59 will take place in exactly the same manner as described in conjunction with the other embodiments.

In the operation of the embodiment of FIGURES 6 and 7, when inserting or removing the contact lens from the respective cavities 58 and 59, one lens is first received in the cavity and the cover member then swung downwardly and locked by the slide block associated therewith prior to opening the other cover to receive the other lens. The same procedure is followed when removing the lens so that, as in the case of the other embodiments, there is minimized any possibility of losing the lens.

From the foregoing description, it will be evident that this invention has provided a novel combination contact lens washing and storage device which not only considerably reduces the chances of losing contact lens but greatly facilitates washing and rinsing thereof as well as actually inserting or removing the lens in a manner minimizing risk of losing the same and minimizing the amount of handling.

While only three embodiments have been set forth and described, various other modifications and changes that fall clearly within the scope and principles of this invention will occur to those skilled in the art. The contact lens holder is therefore not to be thought of as limited to the particular examples set forth merely for illustrative purposes.

What is claimed is:

1. The combination comprising: a contact lens; a base member having a cavity for receiving said lens; and a cover member movable to a first position flush with and over said cavity to cover said lens, both said base member and cover member having communication openings passing from their exterior surfaces into said cavity when said cover member is in said first position, each of said openings having dimensions smaller than the dimensions of said lens whereby said lens is retained in said cavity when said cover is in said first position and said base and cover members are moved back and forth through a cleaning solution to wash said lens.

2. A contact lens holder according to claim 1, in which said cover member is centrally pivoted to said base member for movement in a plane parallel to the plane of the peripheral opening of said cavity on said base member whereby that portion of said cover member including said communication openings may be slid over said cavity to said first position to cover the same and slid free of said cavity to a second position to expose said peripheral opening so that said lens may be removed.

3. A contact lens holder according to claim 2, including ball and detent means incorporated in said base and cover members respectively for indexing said cover member to said first position.

4. A contact lens holder according to claim 1, in which said cover member is hinged to said base member for swinging movement whereby that portion of said cover member including said communication openings may be swung over said cavity to said first position to cover the same and swung free of said cavity to a second position so that said lens may be removed.

5. A contact lens holder comprising, in combination: a base member having a cavity for receiving said lens; and a cover member movable to a first position over said cavity to cover said lens, both said base member and cover member having communication openings passing from their exterior surfaces into said cavity when said cover member is in said first position, each of said openings having dimensions smaller than the dimensions of said lens whereby said lens is retained in said cavity when said cover is in said first position and said base and cover members are moved back and forth through a cleaning solution to wash said lens; said cavity constituting a circular bore of diameter greater than the diameter of said lens, said bore extending into said base member for a distance less than the thickness of said base member, said communication openings in said base member including a series of holes intercepting the periphery of said bore and extending parallel to the axis of said bore entirely through the thickness of said base member, said communication openings in said cover member including a series of holes passing entirely through said cover member and respectively registering will said series of holes in said base member when said cover member is in said first position.

6. A contact lens holder comprising, in combination: a circular disc having first and second circular bores passing into one surface and terminating short of the opposite surface to define first and second cavities for receiving left and right eye contact lens, respectively, said cavities being radially spaced from the center of said disc and circumferentially spaced from each other; and a cover means centrally pivoted to said base member, said cover means comprising a circular member of diameter sufficient to cover said cavities when concentrically positioned over said disc, said disc including a large circular opening of dimensions greater than the dimensions of said lens radially spaced from the center of said disc by a distance equal to the radial spacing of said cavities, said cover means being designed for movement from a first position in which at least one of said cavities is covered to a second position in which said one cavity is exposed, said cover means and disc each including communication openings passing into said cavities when said cover means is in said first position for permitting a cleaning solution to pass through said cavity, said communication openings having dimensions smaller than the dimensions of said contact lens whereby said lens are locked in said cavities when said cover means is in said first position, and whereby rotation of said disc successively positions said circular opening over said cavities to enable insertion and removal of said lens.

References Cited in the file of this patent

UNITED STATES PATENTS

| | | |
|---|---|---|
| 246,040 | Sheldon | Aug. 23, 1881 |
| 367,941 | Waite | Aug. 9, 1887 |
| 1,473,783 | Douglas | Nov. 13, 1923 |
| 1,863,683 | Bowles | June 21, 1932 |
| 2,092,510 | Haut | Sept. 7, 1937 |
| 2,706,992 | Friedman | Apr. 26, 1955 |
| 2,919,796 | Pressl | Jan. 5, 1960 |
| 2,932,383 | Fagan | Apr. 12, 1960 |
| 2,948,387 | Fishman | Aug. 9, 1960 |

FOREIGN PATENTS

| | | |
|---|---|---|
| 592,531 | France | May 1, 1925 |